United States Patent
Lacher et al.

(10) Patent No.: US 12,304,050 B2
(45) Date of Patent: May 20, 2025

(54) DEVICE FOR SUPPLYING A POWER TOOL WITH ELECTRICAL ENERGY, AS WELL AS THE USE OF A LOAD RESISTOR FOR ABSORBING AND/OR CONVERTING ELECTRICAL ENERGY, SYSTEM AND OPERATING METHOD

(71) Applicant: Hilti Aktiengesellschaft, Schaan (LI)

(72) Inventors: Michael Lacher, Schwabmuenchen (DE); Stefan Ringler, Schwabmuehlhausen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 18/277,088

(22) PCT Filed: Nov. 24, 2021

(86) PCT No.: PCT/EP2021/082782
§ 371 (c)(1),
(2) Date: Aug. 14, 2023

(87) PCT Pub. No.: WO2022/179722
PCT Pub. Date: Sep. 1, 2022

(65) Prior Publication Data
US 2024/0123591 A1   Apr. 18, 2024

(30) Foreign Application Priority Data
Feb. 26, 2021   (EP) .................... 21159606

(51) Int. Cl.
*B25F 5/00* (2006.01)
*H02J 7/00* (2006.01)

(52) U.S. Cl.
CPC ............ *B25F 5/00* (2013.01); *H02J 7/00308* (2020.01)

(58) Field of Classification Search
CPC ................. B25F 5/00; H02J 7/00308
See application file for complete search history.

(56) References Cited

U.S. PATENT DOCUMENTS 5,449,992 A * 9/1995 Geiger ............... H02P 3/06
                                                   318/365
2013/0314007 A1   11/2013 Kenya et al.
(Continued)

FOREIGN PATENT DOCUMENTS

EP         3373431 A1     9/2018

OTHER PUBLICATIONS

International Search Report of PCT/EP2021/082782 dated Feb. 14, 2022.

*Primary Examiner* — Michelle Lopez
(74) *Attorney, Agent, or Firm* — Davidson Kappel LLC

(57) ABSTRACT

A device for supplying a power tool with electrical energy is provided. The device has a load resistor for absorbing electrical energy, which may be in particular electrical energy that is produced or released when a power tool or its tool is braked. In addition, the released braking energy can be converted into heat by the load resistor. A system which includes a device and a power tool, a load resistor of the device being set up to absorb electrical energy that is released during a braking process of the power tool. The released braking energy can be converted into heat by the load resistor. The use of a load resistor for absorbing such electrical energy released during a braking process of a power tool or for converting the braking energy into thermal energy, as well as an operating method for a system which includes a energy supply device and a power tool.

9 Claims, 2 Drawing Sheets

(56) References Cited

U.S. PATENT DOCUMENTS

2018/0257511 A1\* 9/2018 Bucella ................... H02P 6/18
2018/0370010 A1\* 12/2018 Xie .......................... H02J 7/14
2020/0130127 A1 4/2020 Yoshinari et al.

\* cited by examiner

DEVICE FOR SUPPLYING A POWER TOOL WITH ELECTRICAL ENERGY, AS WELL AS THE USE OF A LOAD RESISTOR FOR ABSORBING AND/OR CONVERTING ELECTRICAL ENERGY, SYSTEM AND OPERATING METHOD

The present invention relates to a device for supplying a power tool with electrical energy.

BACKGROUND OF THE INVENTION

Power tools, such as hammer drills, angle grinders, core drilling machines or the like, are usually supplied with electrical energy by way of a power cord. In this way, allowance can be made for the requirements for high and continuous energy consumption, so that a user of the power tool can work with the device with as little interruption as possible. However, a trend toward supplying power tools with electrical energy by using batteries or rechargeable batteries can be observed in recent years. In other words, power tools that are operated by rechargeable batteries or batteries are being brought onto the market by the manufacturers. Users expect to be able to dispense with cabling for the device or connecting the device to a power supply system by way of a power cord. However, this can affect the possible available working time of the power tool, especially when there are no replacement batteries or rechargeable batteries on the construction site or when there is no possibility of charging the batteries or rechargeable batteries used in order to continue using them.

In particular, the use and operation of powerful electrical power tools is limited in terms of time due to the batteries available and their power. For applications with a high power requirement, such as carrying out core drilling of holes with a large diameter or for series applications, the required power cannot be provided in an economically viable manner by using multiple batteries or charging intervals.

SUMMARY OF THE INVENTION

In order to remedy this situation, line adapters which can be used to provide an alternative energy supply for battery-operated or rechargeable-battery-operated power tools are known in the prior art. For the operation of a power tool with a line adapter, it would be desirable if the electrical energy that is released for example during a braking process of the power tool were not lost or converted into waste heat, but if the energy could be collected and returned to the system. In the case of a battery-operated or rechargeable battery-operated electrical device, this is easily possible in that such braking energy is fed back into the battery or the rechargeable battery. As a result, the battery or the rechargeable battery is recharged and the energy is later available for the power supply of the power tool. When an electrical power tool is operated with a line adapter, only a comparatively small output capacity of the line adapter is available for the absorption of energy. Only a small fraction of the braking energy usually released can be absorbed however with the help of this output capacity of the line adapter, while the greater part of the energy is lost. In addition, there may be an undesired increase in the voltage between the adapter and the power tool. In this case, no more energy can be fed back, or component defects may even occur. Those skilled in the art therefore assume that, without further measures, a line adapter cannot in principle be used for feedback. This means that "collecting" or reusing the released braking energy is usually not possible when using a line adapter for supplying power to a power tool.

An object on which the present invention is based is to overcome the deficiencies and disadvantages of the prior art described above and to provide a possibility with which braking energy released when using a line adapter for supplying power to a power tool can be returned to the system or dissipated without damaging the components. Another concern on which the invention is based is to provide a system comprising a power tool and a line adapter with which such absorption or dissipation of braking energy is possible, as well as an operating method for such a system.

According to the invention, a device for supplying a power tool with electrical energy is provided, the device comprising a load resistor which is set up to absorb braking energy that is released during a braking process of the power tool. In other words, the device may comprise a load resistor for absorbing electrical energy, this braking energy being released during a braking process of the power tool. With the load resistor, in particular a possibility of feeding electrical energy back into the device can be provided when electrical energy is released during a braking process of the power tool. A major advantage of the invention is that, with the load resistor, the braking energy of the power tool can be converted into heat. It is most particularly preferred in the sense of the invention that the braking energy is converted into dissipatable heat by preferably targeted control of a resistor. Advantageously, the load resistor, which in the context of the present invention is controllable, creates an energy sink in the form of a consumer in order to absorb the excess energy ("braking energy") generated during the braking process or to convert it into heat. It is preferred in particular in the sense of the invention that the braking energy can be absorbed and/or dissipated with the load resistor, the dissipation of the braking energy being achieved in particular by converting the braking energy into heat. It is preferred in the sense of the invention that the thermal energy that is produced during the conversion of the braking energy is dissipated from the area of the device by means of heat sinks and/or cooling devices.

The device may in particular act as a line adapter and is preferably set up to convert an alternating voltage obtained from a public energy or electricity network into a direct voltage. The direct voltage that is generated by the device or the line adapter is preferably a device direct voltage that can be used directly by the power tool. It represents an essential advantage of the invention that the device offers reliable protection against overvoltage damage.

In a further aspect, the invention relates to a system which comprises a device and a power tool, it being possible for electrical energy that is released during a braking process of the power tool to be absorbed by a load resistor of the device. The provision of the load resistor as part of the line adapter advantageously ensures that the adapter or the system can be used for feedback, i.e. the provision of the load resistor allows the electrical energy released when the power tool is braked to be stored in the system and returned later to the system. It may also be preferred in the sense of the invention to convert the electrical energy released into thermal energy. This advantageously allows resource-saving use of energy and cost-efficient operation of the power tool with a line adapter.

It is preferred in the sense of the invention that the load resistor is arranged in a line connection between the power tool and the device. In other words, the load resistor may be located between the power tool and the line adapter, the load resistor being designed in particular as a part or component of the line adapter.

It is preferred in the sense of the invention that the load resistor is designed as a pulse width modulating module (PWM module) or as a binary load resistor. It is preferred in the sense of the invention that the term "binary load resistor" is to be understood as meaning that the load resistor can be switched on and off. It can therefore exist in two states that can be distinguished from one another, specifically switched on or switched off. The load resistor thus preferably represents an on/off-controllable load resistor. If the load resistor is designed as a PWM module, a particularly flexibly controllable and adjustable load resistor can be provided in this way. This advantage of the invention is achieved in particular by the fact that the PWM control can provide a very finely adjustable load resistor which, moreover, is particularly effective, as tests have shown. It is particularly preferred in the sense of the invention that a duty cycle of the control of the load resistor can be set in a range between 0 and 100%. The terms "duty factor" or "pulse duty factor" can preferably also be used synonymously with the term "duty cycle".

If the load resistor is designed as a binary load resistor, an on/off function is thus preferably provided, the states "on" and "off" representing the two different states of the device or the system. In this way, a load resistor and a possibility for absorbing electrical energy can be provided very inexpensively in a system comprising a power tool and a line adapter.

The load resistor may preferably also be designed as a chopper. In the sense of the invention, the term "chopper" preferably describes a control method for the load resistor of the device. This means in particular that the load resistor can be switched on and off, which is referred to in the sense of the invention as a "PWM module". The load resistor of the device may preferably also be referred to as a chopper resistor. Tests have shown that the load resistor can in this way be set particularly finely and flexibly, especially when it interacts with a switch designed for example as a MOS-FET.

It is preferred in the sense of the invention that the load resistor can be controlled in dependence on an output voltage of the device. In this way, closed-loop control for protecting the circuit components used from an overvoltage can be advantageously ensured. In other words, with the corresponding control of the load resistor it can be avoided particularly effectively that there is damage to the components of the device due to a possible overvoltage. In particular, such overvoltage events can be prevented particularly effectively with the invention.

It is preferred in the sense of the invention that thresholds are implemented as hysteresis. In the sense of the invention, the term "threshold" is preferably to be understood as a voltage limit. In particular, the voltage limits can be used to determine when elimination of the braking energy begins or ends. In the sense of the invention, the term "elimination of braking energy" is preferably to be understood as conversion of the braking energy into thermal energy. Starting and stopping the conversion of the braking energy into thermal energy is preferably determined in the sense of the invention in accordance with a voltage control of a direct voltage/direct voltage converter (DC/DC converter), which may preferably also be part of the device. This voltage control is preferably a process running in the background.

It is preferred in the sense of the invention that the device comprises a disconnection device as overload protection.

The overload protection relates in particular to the device and its components. In other words, the disconnection device is set up to effectively and safely protect the device and its components from excessive voltage that can occur during a braking process of the power tool. It is preferred in the sense of the invention that the disconnection device protects in particular the output capacitor and the alternating voltage/direct voltage converter of the device from an excessively high load.

It is preferred in the sense of the invention that the term "output capacitor" denotes the component of the device which carries the capacitance. The term "output capacitance" can therefore preferably also be used synonymously with the term "output capacitor". It is preferred in the sense of the invention that the output capacitor is part of a direct voltage/direct voltage converter of the device. It is preferred in the sense of the invention that the capacitance of the output capacitor is selected according to the desired functionality of the device.

In a second aspect, the invention relates to a system which comprises a device and a power tool, it being possible for electrical energy that is released during a braking process of the power tool to be absorbed by a load resistor of the device.

In a further aspect, the invention relates to a method for operating a system which comprises a line adapter and a power tool. The operating method is characterized by the following method steps:
 a) operation of the power tool,
 b) braking of the power tool, whereby electrical energy is released,
 c) absorption of the released electrical energy by a load resistor of the device of the system or conversion of the released electrical energy into thermal energy by the load resistor.

The type of control of the load resistor preferably allows the energy to be converted into heat in a controlled manner, which is a great advantage of the invention. In particular, this allows the system to used for feedback.

In yet another aspect, the invention relates to the use of a load resistor for absorbing electrical energy that is released during a braking process of the power tool. It is preferred in particular in the sense of the invention that the load resistor is used for converting the braking energy released into thermal energy. The terms, definitions and technical advantages introduced for the device apply analogously to the system, the operating method and the use of the load resistor.

It is preferred in the sense of the invention that the line adapter comprises two components, the first component being able to be referred to as a PFC component, since it preferably comprises a PFC (Power Factor Correction) or is set up to perform a Power Factor Correction function. The second component of the device may be designed in particular as a DC/DC converter. It may in particular be a direct voltage/direct voltage converter, direct voltage in the sense of the invention being denoted by the usual abbreviation DC and alternating voltage by the usual abbreviation AC. Advantageously, the device in its entirety allows conversion of an alternating voltage into a device direct voltage, so that the alternating voltage (AC) obtainable from a public energy network can be converted into a device direct voltage. This advantageously makes it possible with the invention that this device direct voltage can be simply and directly put into effect by the power tool as a consumer. The term "device direct voltage" should be understood in the sense of the invention as meaning that this is the operating voltage needed to operate the power tool or the tool device. This device direct voltage is advantageously output from the device to the power tool, the device direct voltage advantageously being obtained by an AC/DC conversion process by the first component and a DC/DC conversion process by the second component of the device. In other words, the second component in particular converts into a device direct voltage that direct voltage which was previously generated by the first component through a conversion process from the alternating voltage received from the energy network.

The device preferably performs the function of a line adapter which can be used to supply electrical energy to a power tool which is in particular also designed to be operated by batteries or rechargeable batteries. In other words, the invention can represent an alternative energy supply option for a power tool, which can preferably be used when an energy supply with a battery or a rechargeable battery is not an option. This can be the case for example when the batteries or rechargeable batteries carried along are empty or are not available for energy supply for other reasons. With the invention, in particular an AC-DC line adapter can be provided for a power tool, with which the power tool can be supplied with electrical energy for example via a public energy network, the device being set up in particular to convert the alternating voltage provided by the energy network in a device direct voltage, which is required for the operation of the power tool. It is preferred in particular in the sense of the invention that the device is set up to connect the power tool to an energy network. Power plugs and power cords can be used for this.

It is preferred in the sense of the invention that the device can be connected to the power tool by way of the existing battery or rechargeable battery interface of the power tool.

In an alternative, second embodiment of the invention, the device may comprise a housing, the housing being set up to accommodate the parts and components of the line adapter. It is preferred in the sense of the invention that the housing has dimensions that are similar to the dimensions of a battery or a rechargeable battery that can alternatively be used to supply energy to the power tool. This results in good interchangeability of the energy supply means and the user of the power tool can switch particularly easily and conveniently from battery or rechargeable battery operation of the power tool to line adapter operation by using the device.

BRIEF DESCRIPTION OF THE DRAWINGS

Further advantages will become apparent from the following description of the figures. The figures, the description and the claims contain numerous features in combination. A person skilled in the art will expediently also consider the features individually and combine them to form useful further combinations.

In the figure, the same and similar components are numbered with the same reference signs. In the figures.

DETAILED DESCRIPTION

Figure 1:
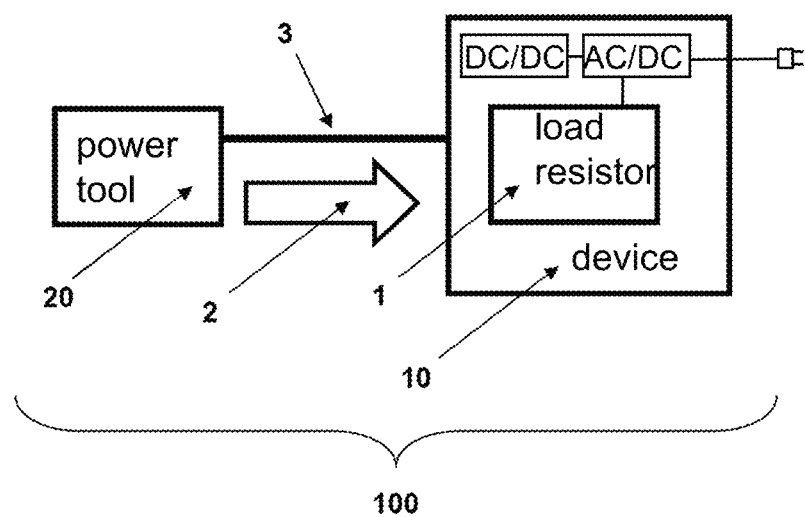
FIG. 1 shows a view of a preferred embodiment of the device with a load resistor

FIG. 1 shows a first preferred embodiment of the device 10 with a load resistor 1, as well as an exemplary power tool 20. The device 10 makes it possible in particular to convert an incoming alternating voltage into a direct voltage, the output direct voltage being in particular a device direct voltage that can be used to supply energy to a power tool 20.

The device 10 also comprises a load resistor 1, the power tool 20 and the device 10 being connected to one another by way of a line connection 3. In the sense of the invention, the line connection 3 may in particular also be referred to as an electrical connection. It is preferred in the sense of the invention that the load resistor 1 is arranged in the electrical connection 3. During a braking process of the power tool 20, energy, in particular braking energy 2, may be released. This braking energy 2 can be absorbed by the load resistor 1 of the device 10 and later returned to the power tool 20—for example to drive it. An alternating voltage/direct voltage converter (AC-DC converter) and an output capacitor (both: not shown) may also be arranged in the device 10, the output capacitor being arranged in the line within the device 10 essentially parallel to the load resistor 1 at the output of the AC-DC converter. Following the AC-DC converter, the line within the device 10 may go over into a power cord and a power plug, with which the device 10 can be connected to a preferably public electricity or energy network. In the example of the invention shown in FIG. 1, the load resistor 1 may be designed to be switchable, so that it is referred to as a "chopper" in the context of the present invention. In the sense of the invention, it is therefore possible for the load resistor to be designed as binary (on/off) or PWM-controlled. The device 10 and the power tool 20 form a system 100 in which the device 10 can be used as a line adapter and for supplying the power tool 20 with electrical energy.

Figure 2:
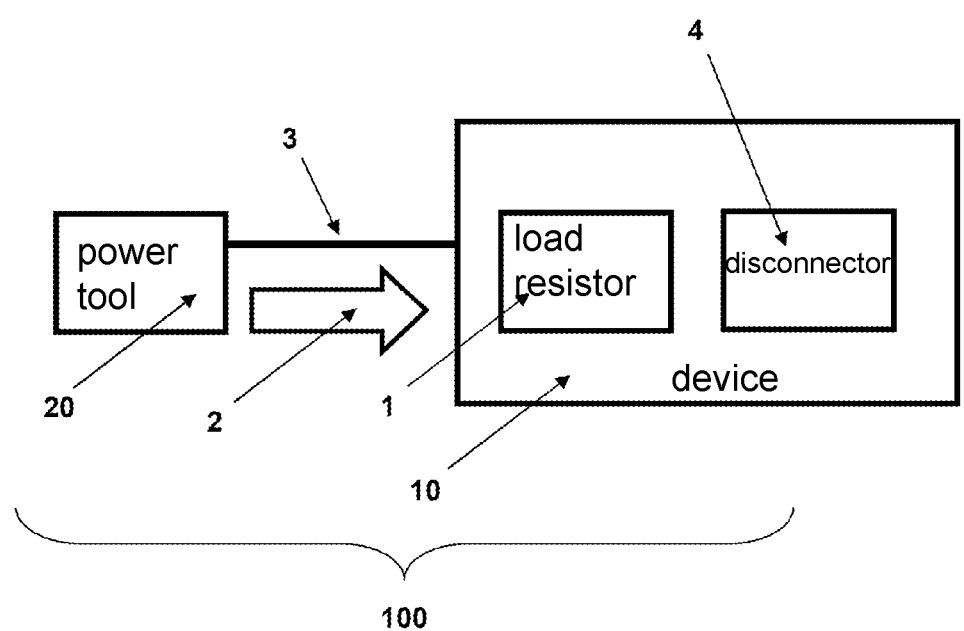
FIG. 2 shows a view of a preferred embodiment of the device with a load resistor and a disconnection device

FIG. 2 shows a second preferred embodiment of the device 10 with a load resistor 1 and a disconnection device 4. In the example of the invention shown in FIG. 2, the disconnection device 4 is arranged between the load resistor 1 and the output capacitor, so that within the electrical line within the device 10 the load resistor, the disconnection device 4, the output capacitor and the AC-DC converter are arranged in this order. The braking energy 2 that is released when the power tool 20 is braked is also shown in FIG. 2 by an arrow. The direction of the arrow is intended to indicate that the released braking energy 2 can be transported from the power tool 20 in the direction of the line adapter 1, where it can in particular be converted into thermal energy. The power tool 20 and the line adapter 10 are preferably connected to one another by way of an electrical connection 3 in which the load resistor 1 can be arranged.

LIST OF REFERENCE SIGNS

1 Load resistor
2 Braking energy
3 Electrical connection between power tool and device
4 Disconnection device as overload protection
10 Device
20 Power tool
100 System

The invention claimed is:

1. A device for supplying a power tool with electrical energy, the device comprising:
 a load resistor, the load resistor being set up to absorb braking energy released during a braking process of the power tool
 wherein voltage limits are implemented as hysteresis.

2. The device as recited in claim 1 wherein the load resistor is arranged at an electrical connection in the device.

3. The device as recited in claim 1 wherein the load resistor is designed as a pulse width modulating module or as a binary load resistor.

4. The device as recited in claim 1 wherein the load resistor is designed as a chopper.

5. The device as recited in claim 1 wherein the load resistor is controllable in dependence on an output voltage of the device.

6. The device as recited in claim 1 further comprising a disconnector as overload protection.

7. A system comprising the device as recited in claim 1 and a power tool, electrical energy released during a braking process of the power tool being absorbable by the load resistor.

8. A method for operating the system as recited in claim 7, the method comprising the steps of:
   a) operating the power tool;
   b) braking the power tool, whereby electrical energy is released;
   c) absorbing the released electrical energy via the load resistor or conversion of the released electrical energy into thermal energy via the load resistor.

9. A device for supplying a power tool with electrical energy, the device comprising:
   a first AC/DC converter to convert an alternating current to direct current with a direct current voltage;
   a DC/DC converter to convert the direct current voltage to a device direct voltage of the power tool; and
   a load resistor, the load resistor being set up to absorb braking energy released during a braking process of the power tool.

\* \* \* \* \*